No. 762,303. PATENTED JUNE 14, 1904.
G. O. GILMER.
PROCESS OF DESTRUCTIVE DISTILLATION OF WOOD.
APPLICATION FILED APR. 2, 1903.
NO MODEL. 3 SHEETS—SHEET 3.
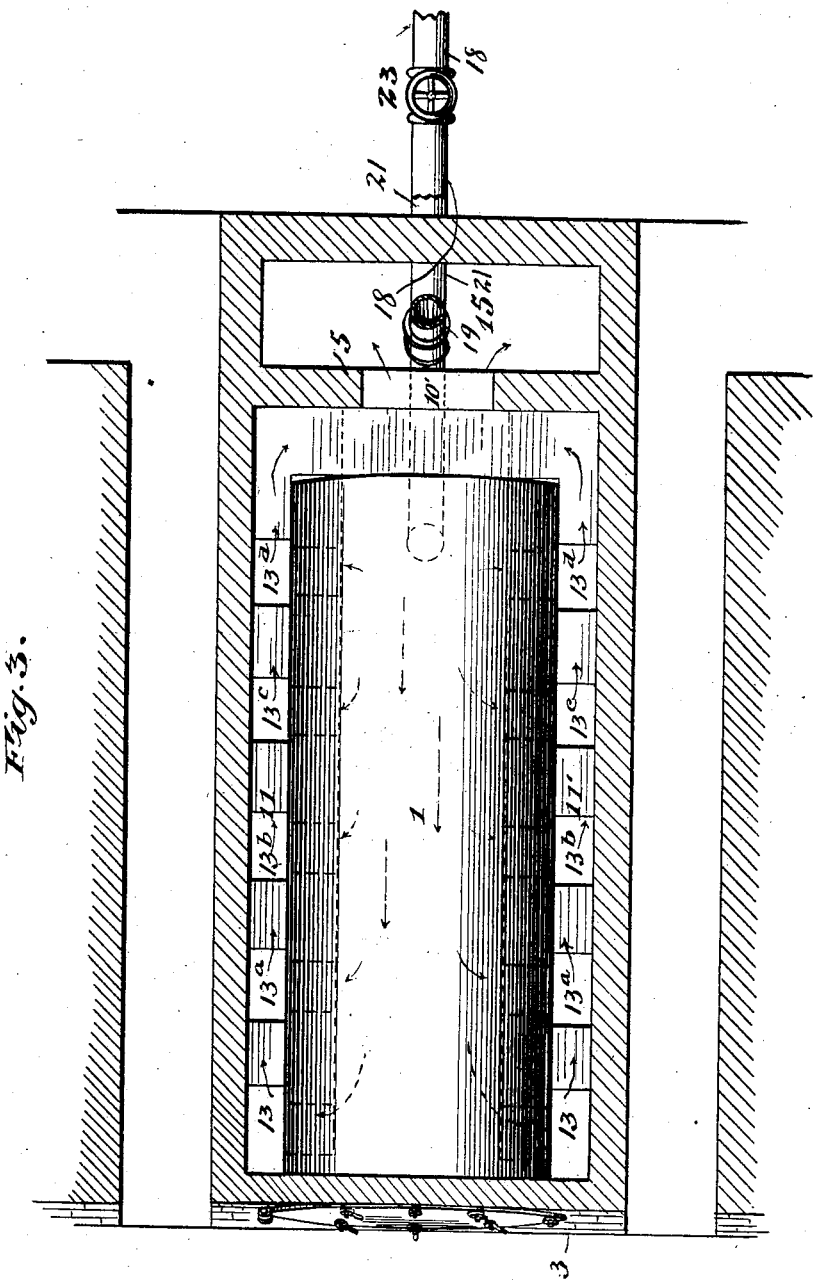

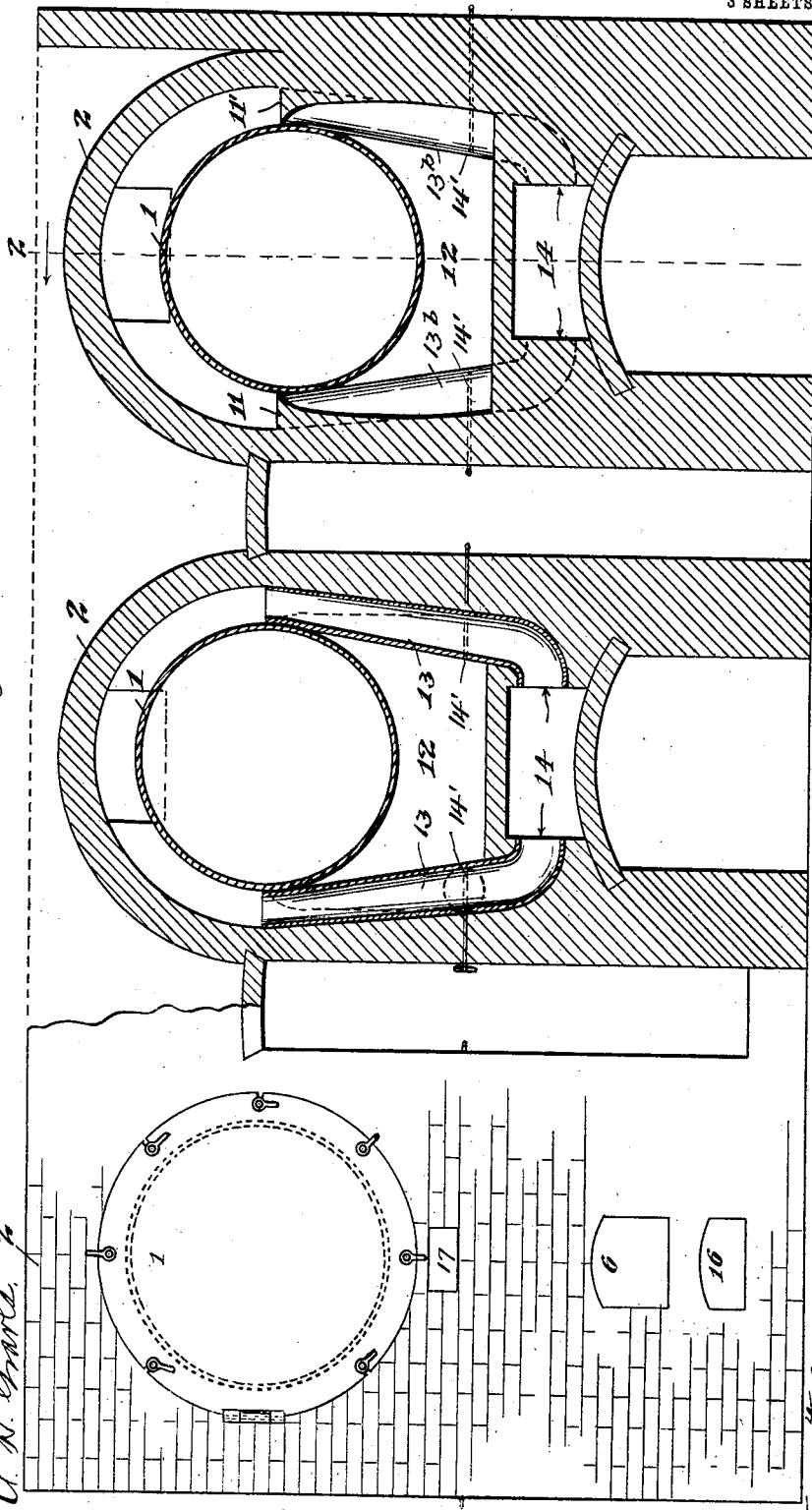

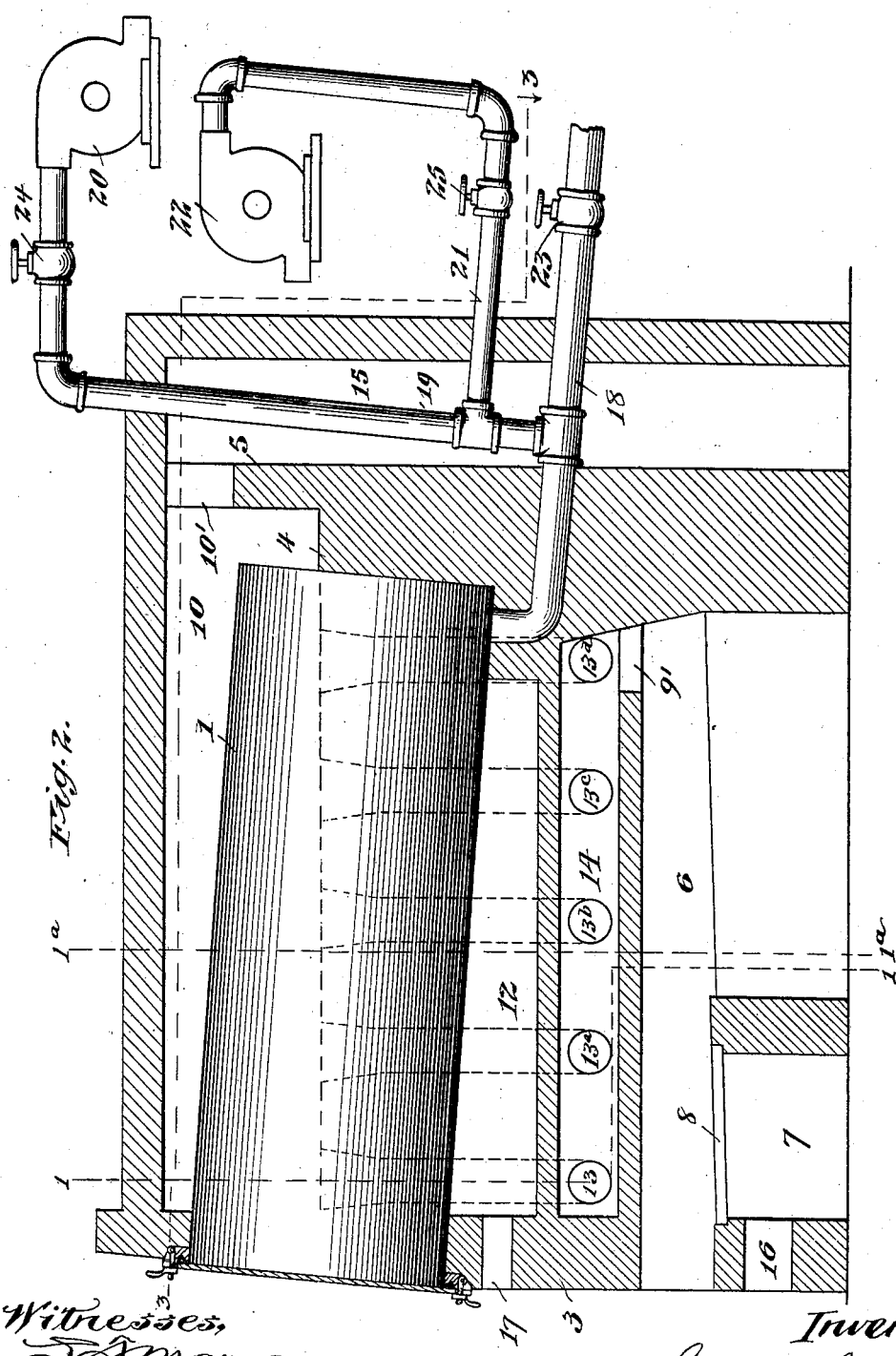

No. 762,303.

Patented June 14, 1904.

UNITED STATES PATENT OFFICE.

GEORGE O. GILMER, OF NEW ORLEANS, LOUISIANA, ASSIGNOR, BY MESNE ASSIGNMENTS, TO ILLINOIS INVESTMENT COMPANY, A CORPORATION OF WEST VIRGINIA.

PROCESS OF DESTRUCTIVE DISTILLATION OF WOOD.

SPECIFICATION forming part of Letters Patent No. 762,303, dated June 14, 1904.

Application filed April 2, 1903. Serial No. 150,840. (No specimens.)

*To all whom it may concern:*

Be it known that I, GEORGE O. GILMER, residing at New Orleans, in the parish of Orleans and State of Louisiana, have invented a certain new, useful, and Improved Process of Destructive Distillation of Wood, of which the following is a specification.

My invention is an improved process for producing turpentine, tar, wood-alcohol, and other products, including charcoal, from fat pine; and the invention has for its salient object to provide a practical process whereby the various distillates may be readily and effectually separated during the progress of the distillation and separately taken off in such manner as to more completely separate the several distillates from each other, and thus enhance the purity and value of each.

The invention consists in the matters hereinafter described, and more specifically pointed out in the claims, and will be better understood by reference to the accompanying drawings, illustrating a suitable apparatus for carrying out the process and forming, therefore, a part of the description of the same.

In said drawings, Figure 1 is a view, partly in front elevation and partly in transverse section, of a bank of furnaces and retorts adapted for carrying out my improved process, the central furnace being shown on the section-line 1 1 of Fig. 2 and the furnace at the right-hand side being shown on the section-line 1ª 1ª of Fig. 2. Fig. 2 is a central longitudinal vertical view taken on line 2 2 of Fig. 1. Fig. 3 is a horizontal sectional view taken approximately on line 3 3 of Fig. 2 and looking downwardly.

In carrying out my improved process I employ a closed retort within which the body of wood to be treated is placed, and this retort is subjected to externally-applied heat so controlled and applied thereto that the contents of the retort are heated progressively. In the process of destructive distillation of wood the vapors of the several distillates are expelled at different temperatures, the turpentine-vapors being first driven off at a comparatively low temperature, approximating 321° Fahrenheit, the acid and creosotic vapors at a somehat higher temperature, and the tar-oils at a still higher temperature. In carrying out my invention I take advantage of this fact and so control and apply the heat that the vapors of the different distillates are expelled successively, and so control and handle the vapors that they are separately drawn off practically as fast as formed, thereby preventing the vapors of one distillate from contaminating those of another. To accomplish this end, I so apply the heat to a large body of wood contained in a closed receptacle that initially a portion only of the wood is heated and the heat is caused to progress through the body of wood gradually and slowly enough to enable the lighter vapors which are first driven off to be drawn off in advance of the formation of the heavier vapors. The application of the heat locally is continued for the double purpose of causing the heat to progress through the body of wood and to raise the contents gradually to higher and higher temperatures until the process of distillation is completed. Because of the progressive heating and continued application of heat it follows that when the wood at one point in the receptacle has reached the proper temperature to begin to throw off the lightest vapors the contents which are nearer the point where the heat is applied will have reached a higher temperature, so that at or before the time when the last of the lighter vapors are expelled the heavier vapors will have begun to form in the hotter parts of the retort. It follows, therefore, that the withdrawal of the vapors may be continuous, but that at different times during the process, as the character of the vapors change, the vapors must be diverted to different receptacles to effect their proper separation. It also follows that the heat must be controlled and applied with more or less uniformity and so gradual as to enable each successively-heavier distillate which it is desired to separate from the others to be substantially all expelled before the succeeding heavier distillate is expelled to any considerable extent.

In view of the fact that heat within a closed receptacle like a retort tends always to rise to the highest portion thereof I preferably carry out the process in such manner that the heat is caused to progress downwardly, being thereby enabled to more effectually control the application of the heat, and since it is necessary to withdraw the vapors in advance of the heat— i. e, without passing the vapors through a more highly heated portion of the retort—I preferably withdraw the vapors from the bottom of the retort. Moreover, by carrying out the process in the manner described I am enabled to withdraw both the vapors and the liquid distillates from the cool part of the receptacle, and conveniently through the same eduction-pipe. Since the liquid distillates obviously tend to collect in the bottom of the receptacle and since it is essential that the liquid distillates also be withdrawn from the receptacle without overheating, the method or process of causing the heat to progress downwardly during the distillation assumes increased importance, since I am thereby enabled to withdraw the liquid as well as the vaporized distillates from the cool part of the receptacle.

Having thus explained the general characteristics of my improved process, I will now describe the same as carried out by the use of one specific form of apparatus well adapted for the purpose.

Referring to the drawings, 1 designates the several retorts, of which three are shown in the present instance, each of which is preferably of cylindric form and disposed in an approximately horizontal position, but inclined downwardly slightly toward the rear, so as to direct the liquid products toward that end.

2 designates as a whole each of the several furnaces, which are of similar construction, as well, also, as the retorts and other features of the apparatus, so that the description of a single unit will apply equally to the three shown.

Each retort is mounted in a furnace-setting so constructed that the principal portions of its upper and lower halves are exposed within separated chambers, the front end of the retort being supported in the front end wall of the furnace 3, while its rear end is similarly supported by an inward extension 4 of the rear end wall 5.

6 designates the main combustion-chamber, 7 the ash-pit, and 8 the grate of the furnace proper, which is located vertically beneath the retort and arranged to extend longitudinally of the latter. At the rear end of the combustion-chamber the latter communicates with a return-passage 14 through an opening 9', which return-passage extends forwardly throughout substantially the full length of the retort. From each side of said return-passage 14 at laterally-opposite points lead outwardly and upwardly uptake-flues 13, 13$^a$, 13$^b$, 13$^c$, and 13$^d$, these flues being in the present instance formed by pipes and opening at their upper ends into the main heating-chamber 10, within which the upper half of the retort is exposed.

11 11' designate inwardly-extending projections upon the inner side walls of the retort-chamber, which projections extend throughout the length of the retort at each side thereof, except where interrupted by the uptake-flues 13 13$^a$, &c., which extend therethrough, thereby dividing the space above the upper half of the retort and that below the same into two chambers—namely, the main heating-chamber 10, hereinbefore referred to, and a dead-air chamber 12, within which the lower half of the retort is exposed. Each of the several uptake-flues 13 13$^a$, &c., is provided with a damper 14', whereby it may be closed or partially closed. An outlet-passage 10' leads from the main heating-chamber 10 to the smoke-chamber 15, which is in communication with the chimney-stack.

The dead-air chamber 12, hereinbefore referred to, is entirely closed except for an air-inlet passage 17, which will be controlled by a suitable damper. (Not shown.)

18 designates an outlet-pipe arranged to communicate at its inner end with the lower side of the retort, at the rear end thereof, and extends thence rearwardly and downwardly to a point outside of the furnace, this pipe being inclined to facilitate the outflow of the tarry liquid product. It is to be noted that said outlet-pipe extends in part through the solid masonry and in part through the smoke-chamber 15 and that it is subject to the heat transmitted to the masonry from the products of combustion passing through the return-flue 14 and to the heat obtaining within the smoke-chamber. At a point inside of the smoke-chamber a branch vapor-pipe 19 communicates with the upper side of the main outlet-pipe and leads thence upwardly through the top wall of the smoke-chamber and thence laterally to an exhaust-blower 20. At a point between the exhaust-blower and the top wall of the smoke-chamber said vapor-pipe is provided with a valve 24. A second branch vapor-pipe 21 is arranged to communicate with the pipe 19 at a point intermediate the length of the latter, which branch vapor-pipe 21 leads to and connects with a second blower 22. (Shown in conventional form.) The main outlet-pipe 18 is provided with a valve 23, located at a point outside of the smoke-chamber wall, and the branch pipe 21 is also provided with a valve 25, likewise located outside of the smoke-chamber. It will be understood that the delivery side of the exhaust-blower 20 communicates with a condensing apparatus, (not shown,) while the main outlet-pipe 18 leads to any suitable receptable for the tarry products.

In carrying out my improved process by the use of the apparatus thus described the retort is filled with wood and hermetically sealed. The furnace is then fired and the pair of flues 13 at the forward end of the retort opened, so that the products of combustion pass upwardly from the return-passage 14 through said flues 13 and are delivered to the main heating-chamber 10 at the front end of the latter and pass rearwardly over the upper half of the retort. With the circulating-passages thus adjusted the heat is continued for a considerable period of time and until the turpentine-vapors in that particular section of the retort have been fully expelled, whereupon the second pair of flues from the forward end 13ª are opened and the products of combustion circulated through this pair of flues until the turpentine within this zone is fully expelled, whereupon the next pair of flues will be opened, and so on until the heat has been caused to progress throughout the full length of the retort. If necessary, after the turpentine has been thoroughly expelled the dampers of the uptake-flues may be readjusted, so as to again subject the contents of the retort to a second progressive heating in order to expel the heavier vapors and tarry products.

The contents of the retort are in this manner heated at the top first, and the heat is caused to progress both downwardly and throughout the whole length of the retort. The turpentine-vapors are the first to be expelled and are drawn off from the eduction-pipe 18 through the branch pipe 19 by the exhaust action of the blower 20. The fact that the outlet is located at the bottom of the retort insures that the vapors will pass downwardly and rearwardly away from the heated portions of the retort and through the cooler parts thereof. The vapors which are expelled at a higher degree of temperature than that at which the turpentine-vapors are driven off are detrimental to the quality of the turpentine, and it follows that the turpentine-vapors are by this method extracted in advance of and before they can be contaminated with the said detrimental vapors. The turpentine-vapors are driven off at approximately 321° Fahrenheit, while a temperature of some 400° Fahrenheit is necessary before the tar and creosote oils begin to flow. When, therefore, the heat within the upper part of the retort reaches approximately 400° Fahrenheit, the wood at that point will begin to give off tar and oils, while the wood below, being cooler, is still giving off turpentine-vapors. If the turpentine-vapors were drawn off in a direction to pass through the more heated parts of the retort, the turpentine, being a powerful solvent of these oils, would become charged with them, and thus greatly impaired in quality.

In this connection it is to be noted that inasmuch as the tendency of the heated gases and vapors within the retort is to rise to the highest point the heat may be practically controlled and caused to progress gradually and steadily downwardly through the retort by applying it to the upper half only of the retort in the manner described and meantime protecting the lower half of the retort from being subjected to any considerable degree of heat. This protection of the lower half is afforded by means of the dead-air chamber 12, which serves as an effective insulation to prevent the heat passing through the return-flue 14 and uptake-flues 13 13ª, &c., from reaching the retort.

As soon as the turpentine-vapors in the wood have been substantially all expelled and creosotic and tarry vapors commenced to come off the valve 24 is closed (it being understood that valves 23 and 25 were closed during the withdrawal of the turpentine-vapors) and the valve 25 is opened and the blower 22 started, whereupon the vapors coming off will be drawn out through the branch pipe 21 and delivered to a suitable condensing apparatus. (Not shown.)

The heat is continued for some time after the vapors cease to come off in order to convert the wood within the retort into charcoal.

I claim as my invention—

1. A process of destructive distillation of wood, which consists in inclosing a body of wood in a closed receptacle, applying transmitted heat to a localized portion of said body of wood of limited extent, continuing the application of heat and controlling the same to cause the heated area to progress through the body of wood gradually, and separately drawing off different vapors of distillation as they are successively formed.

2. A process of destructive distillation of wood, which consists in inclosing a body of wood in a closed receptacle, applying transmitted heat to a localized portion of said body of wood of limited extent, continuing the application of heat and controlling the same to cause the heated area to progress through the body of wood gradually, and separately drawing off different vapors of distillation as they are successively formed, said vapors being drawn from a portion of the receptacle remote from the point at which the heat is initially applied.

3. A process of destructive distillation of wood, which consists in inclosing a body of wood in a closed receptacle, applying transmitted heat to the upper portion only of the body of wood, continuing the application of heat and controlling the same to cause the heated zone to progress downwardly gradually, and separately drawing off different vapors of distillation as they are successively formed.

GEORGE O. GILMER.

Witnesses:
ALBERT H. GRAVES,
FREDERICK C. GOODWIN.